United States Patent Office 2,887,725
Patented May 26, 1959

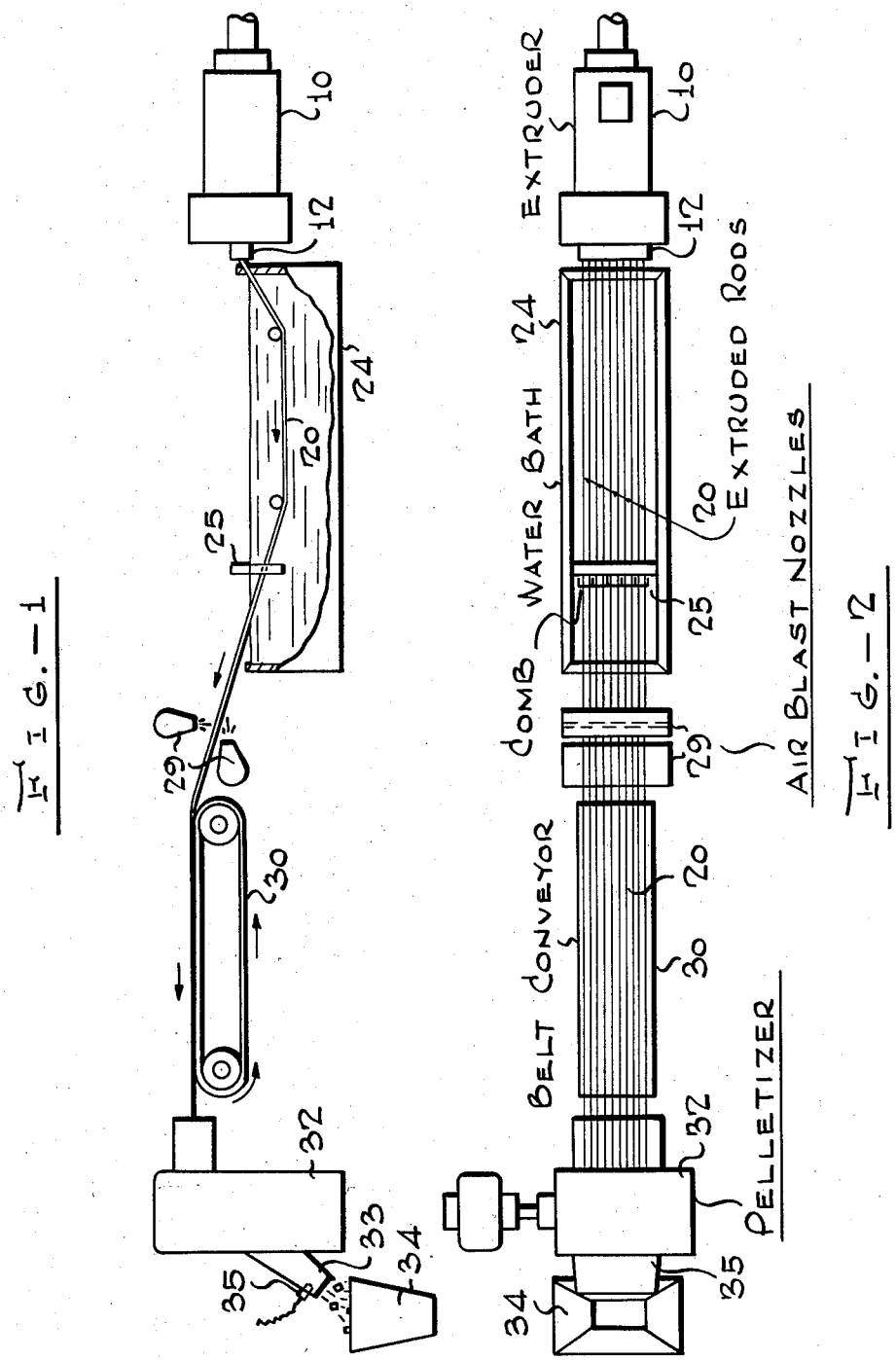

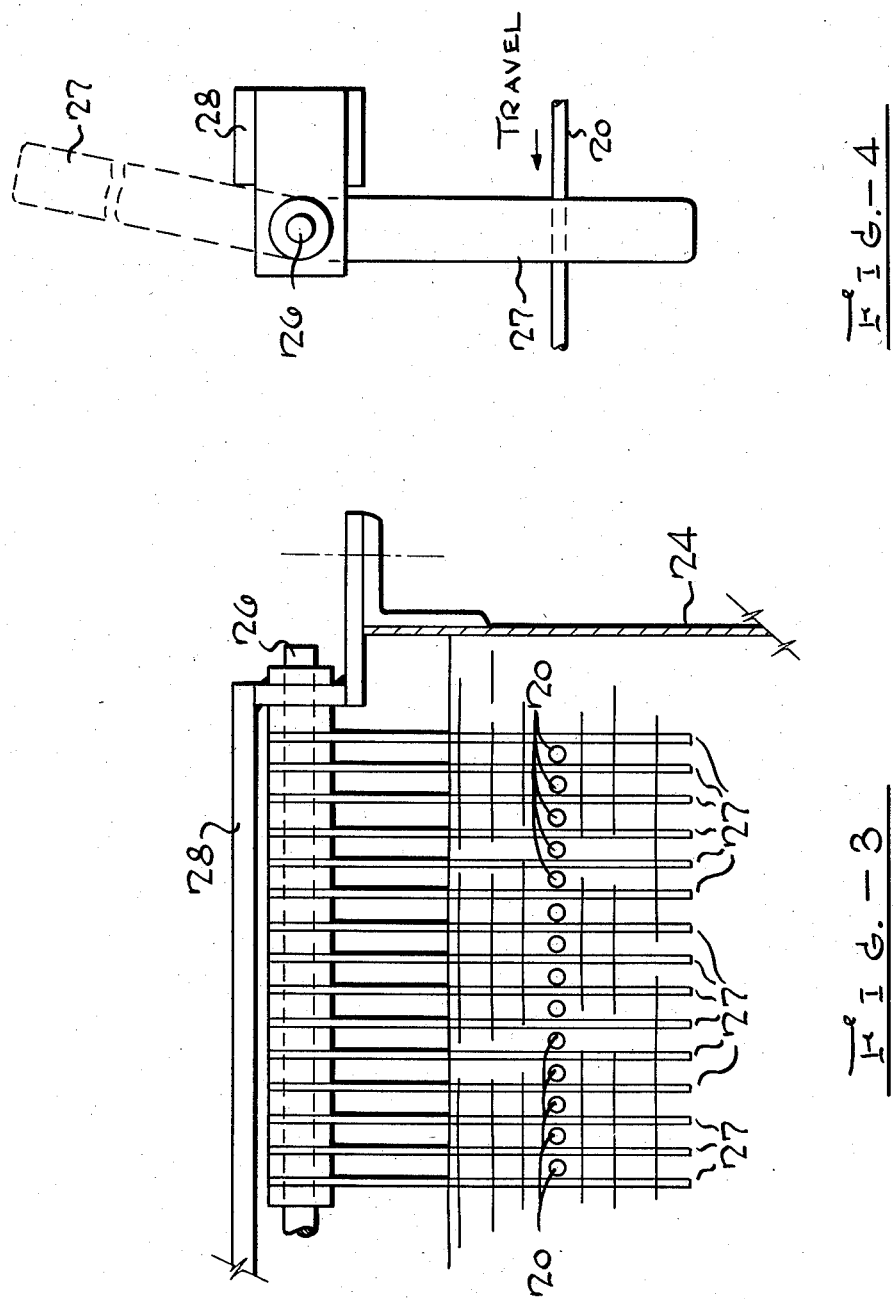

2,887,725

MANUFACTURING THERMOPLASTIC PELLETS

Herbert H. Vickers, Union, and Stanley E. Jaros, Rahway, N.J., assignors to Esso Research and Engineering Company, a corporation of Delaware Application May 22, 1952, Serial No. 289,264

8 Claims. (Cl. 18—47.5)

The present invention relates to the manufacture of pellets of thermoplastic material and relates more particularly to an improved method for the pelletization of thermoplastic materials having low softening points.

It is known to prepare pellets of thermoplastic materials by extruding them in the form of thin rods, cooling the rods in a water bath, and cutting the rods by means of a suitable cutter. However, when this technique is applied to copolymers of styrene and isobutylene as described and claimed in U.S. Patent 2,274,749, difficulties arise due to the occlusion of water on the surface of the rods, and to the tendency for the rods to stick together following the extrusion operation.

It is, accordingly, the main object of the invention to provide an improved method of producing pellets of thermoplastic materials having low softening point.

Another object of the invention is the provision of a method of manufacturing thermoplastic pellets in a continuous process in which a plurality of slender rods of the thermoplastic material is extruded simultaneously in close proximity, yet not touching, cooled in a water bath and then separated to give a plurality of dry rods which are then suitably cut into pellets.

Certain preferred details of construction, together with additional objects and advantages, will be apparent and the invention itself will be best understood by reference to the following specification and to the accompanying drawings wherein:

Figure 1 is a side view of apparatus embodying the present invention and is illustrative of the method.

Figure 2 is a plan view thereof.

Figure 3 shows detail of the comb arrangement.

Figure 4 shows how individual fingers of the comb are moved to allow passage of distorted rods.

In accordance with the present invention, there is utilized an extrusion machine 10 in which the plastic is heated and from which the heat softened plastic is extruded. As supplied to the extrusion machine, the thermoplastic material may be in any suitable form, but is preferably in the form of a strip which is preferably pre-heated so as to reduce the heating load upon the extruder and thus increase its capacity. The preliminary heating and softening of the plastic can most economically and effectively be done on a hot rubber mill with a strip continuously cut off the mill and fed immediately to the extruder. With the extruder feed in this form, the capacity of the extruder is 2 to 3 times as great as with a cold granular feed. Control of the extruder feed rate is also much improved by this technique and the diameter of the extruded rods kept more uniform. The extrusion machine may be of any standard or conventional construction designed for the extrusion of plastics. This type of machine generally has a screw which is quite long compared to its diameter and has rather shallow flights. In performing the method of the present invention, the extrusion machine is provided with a die plate 12, which is provided with a plurality of openings disposed laterally of each other in close relation. The plastic material is extruded in the form of a plurality of slender rods 20 of uniform cross-section. The rods need not necessarily be extruded in one plane. For example, the holes might be staggered into as many as two or three tiers. If the rods are extruded in one plane, it need not be horizontal. It may be vertical. The rods 20 which issue from the extrusion apparatus in a heat softened state are cooled in order to harden the rods. For this purpose cold water is used as the cooling agent. As shown, the rods 20 are caused to travel longitudinally of a trough 24 containing the cooling water which flows continuously through the trough. After stretching all the rods enter the water both in the same plane, regardless of how they are extruded. The trough 24 is brought as close as possible to the die plate 12 and the water is allowed to overflow over the front edge of the trough so that all the rods enter the water at precisely the same distance from the die. This results in the rods being all stretched to the same extent and also prevents the rods from sticking to each other since the water cools, and thus case-hardens, the rods so that the surface is not tacky.

As the rods pass through the water, they contact comb 25, which separates the rods sufficiently so that water will not be occluded in the spaces between the rods as they emerge from the cooling bath. Comb 25 consists of a supporting rod 26 having a plurality of depending fingers 27 hingedly attached thereto. If a rod passing between the fingers 27 should have a lump on the side, the hinged arrangement allows the finger to be pushed out of the way as shown in Figure 4. The arc through which the finger can move is limited by means of stop bar 28. It requires little force to keep the rods apart since they are formed with a space between them and are under tension in the bath. The tension is supplied by the conveyor belt and feed rolls on the cutter. The comb 27 is preferably placed 3–6 inches either before or after the rods emerge from the water. It is particularly important that the comb not be located at the point of emergence of the rods from the water since this prevents a clean break of the water away from the rods. It is further important that the water be quiescent at the point where the rods emerge since if any ripples are present on the surface of the water, they tend to break up the clean meniscus around the rods. This requires placing the bath so that it is free from vibration due to adjacent machines. As the rods emerge from the water, after having been kept separated by passing through the comb arrangement, the water forms an inverted meniscus around each rod so that, after emergence, they are free of surface water as the water does not wet the thermoplastic material. However, since tiny droplets may occasionally remian on the surface of the rods, they are passed between air jets 29. These air jets are so positioned that the resultant component of the jets does not strike the surface of the water and cause it to ripple. Although the air jets very easily blow off small droplets, especially since the rods are separated into individual strands and permit unhindered flow of high velocity air around each rod, if the rods are introduced between the jets after having emerged from the water without being separated by the comb, the large amount of water which is carried between the rods is not effectively blown off and surface water remains on the rods and gets into the product. The water remains on the rods despite the air blowing because there is so much water it spreads out as a film on the rods and the flow of air around each individual rod is hindered by an adjacent rod.

The rods, after being dried, pass onto endless belt 30 to the cutting device at the pelletizer 32. The belt provides tension on the rods. The degree of stretch on the rods, and therefore the final diameter of the pellet, is controlled by the relative speed of the belt and the speed of the plastic rod issuing from the extruder die. Pellets emerge from the pelletizer 32 through chute 33 and are deposited in container 34.

During the operation of cutting the rods into pellets, an electrical charge builds up on the pellets which tends to cause the pellets to stick together, to stick to containers in which they may be stored and to pick up dust from the air. This static charge is effectively eliminated by placing a radium-containing bar 35 in the effluent chute 33 from the pelletizer, thus allowing the static charge to leak away and leave the pellets neutral.

It will be understood that conveyor belt 30 and cutters in the pelletizer 32 are driven in timed relation to each other and to the operation of the screw of the extrusion machine 10, so that as the gang of rods issues from the extrusion machine, it moves at uniform speed in the direction of its length from the extrusion machine to the pelletizer. Normally, the rod will be extruded 50% to 100% larger diameter than the final desired diameter of the pellet so as to minimize number of holes in the die for a given production rate. Therefore, the conveyor belt and cutter feed rolls will travel from 2.25 to 4 times faster than the extrusion at the die plate (as the diameter reduction, squared).

The word "diameter" does not imply that the rods must have a cylindrical cross-section. The cross-section may be square, rectangular or other desired shape As pointed out above, the invention is particularly directed to preparing pellets from copolymers of isobutylene and styrene. Such copolymers are prepared by contacting the monomers at temperatures below 0° C. in the presence of an active halide polymerizing catalyst such as boron fluoride or aluminum chloride, with or without substances such as propane, ethylene or chlorinated hydrocarbons as diluents, solvents or refrigerants.

By adjusting the proportions of the two raw materials, copolymers of any desired hardness, melting point or elasticity may be obtained.

The foregoing description does not by any means cover the possible uses of our invention or the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

The nature of the present invention having been thus fully set forth and specific examples of the same given, what is claimed as new and useful and desired to be secured by Letters Patent is:

1. In a method of manufacturing moldable thermoplastic pellets, the combination which comprises extruding from a thermoplastic material a plurality of separate rods lying close together, moving said rods under tension in the direction of their length concurrently with their formation, immersing said rods in a water bath as soon as possible after they are formed, said tension being applied at a point beyond the point of emergence of the rods from the water bath and sufficiently faster than the rate of extrusion that the diameters of the rods are substantially reduced as the rods travel from the point of extrusion into the water bath, said diameters of the rods being reduced to an amount to prevent sufficient swelling whereby the rods could adhere, the rate of differential between the rod-drawing means and the extruding means being about such a rate that the rod-drawing means travels from about 2.25 to about 4 times faster than the extruding means.

2. In a method of manufacturing moldable thermoplastic pellets, the combination which comprises forming from a thermoplastic material a plurality of separate rods lying close together, moving said rods under tension in the direction of their length concurrently with their formation, immersing said rods in a bath as soon as possible after they are formed, said tension being applied at a point beyond the point of emergence of the rods from the bath and sufficiently faster than the rate of extrusion that the diameters of the rods are substantially reduced as the rods travel from the point of extrusion into the water bath, said diameters of the rods being reduced to an amount to prevent sufficient swelling whereby the rods would adhere, maintaining the rods separated while in the water as they continue to move, maintaining the bath at the point of emergence in a state of quiescence, placing a pivotally supported spacing means at a point sufficiently close to the point of emergence of the rods that they will not adhere, withdrawing the rods from the bath at the point of quiescence, and drying the rods.

3. In the method of manufacturing moldable thermoplastic pellets from thermoplastic materials having low softening points the combination of which comprises extruding from a thermoplastic material a plurality of separate rods lying close together, moving said rods in the direction of their length concurrently with their formation, immersing said rods in a common water bath as soon as possible after they are formed, pulling said rods under tension through said water bath at a sufficiently faster rate than the rate of extrusion that the diameter of the rods is reduced to an amount to prevent sufficient swelling whereby the rods would adhere, withdrawing the rods from the water while still applying tension, and concurrently severing successive free transverse end portions of the rods to form individual pellets.

4. In the method of manufacturing moldable thermoplastic pellets, the combination which comprises forming from a thermoplastic copolymer of isobutylene and styrene a plurality of separate rods, moving said rods in the direction of their length concurrently with their formation, immersing said rods in a bath as soon as possible after they are formed, applying tension to said rods by a rod-drawing means, the tension being sufficient that the diameter of the rods are reduced to an amount to prevent sufficient swelling whereby the rods would adhere, withdrawing the rods from the bath while still under tension and drying the rods while under tension.

5. In the method of manufacturing moldable thermoplastic pellets of isobutylene and styrene, the combination which comprises forming a plurality of separate rods of said copolymer, moving said rods in the direction of their length as they are formed, immersing said rods in a water bath as soon as possible after they are formed, maintaining the rods separated while in the water as they continue to move by means of a pivotally mounted comb, said comb not being positioned at the point where the rods emerge from the water, withdrawing the rods from the water faster than the rate of formation of the copolymer, and applying sufficient tension to the rods throughout so that the diameters of the rods are reduced to an amount to prevent sufficient swelling whereby the rods would adhere.

6. In the method of manufacturing moldable thermoplastic pellets of isobutylene and styrene, the combination which comprises forming a plurality of separate rods of said copolymer, moving said rods in the direction of their length as they are formed, immersing said rods in a water bath as soon as possible after they are formed, maintaining the rods separated while in the water as they continue to move, maintaining the water in the bath in a state of quiescence sufficient that the rods form an inverted meniscus of the water as they emerge therefrom whereby to emerge substantially water-free, withdrawing the rods from the water faster than the rate of formation of the copolymer, applying sufficient tension to the rods throughout so that the diameters of the rods are reduced to an amount to prevent sufficient swelling whereby the rods would adhere, and removing any residual water from the rods by an air-blowing means.

7. In the method of manufacturing moldable thermoplastic pellets of isobutylene and styrene, the combination which comprises forming a plurality of separate rods of said copolymer, moving said rods in the direction of their length as they are formed, immersing said rods in a water bath as soon as possible after they are formed, maintaining the rods separated while in the water as they continue to move, said water at the point of emergence being maintained in a state of quiescence and the rods which are maintained separated while in the water cause an inverted meniscus by each rod as it emerges from the water bath whereby the rods emerge from the water bath in a substantially dry condition, withdrawing the rods from the water faster than the rate of formation of the copolymer, and applying sufficient tension to the rods throughout so that the diameters of the rods are reduced to an amount to prevent sufficient swelling whereby the rods would adhere.

8. The combination of claim 7 wherein the tension is caused by a rod-drawing means and the rod-drawing means is run at a rate to supply sufficient tension that the swelling of the rods between the zone where they are initially formed to the surface of the water is substantially eliminated.

References Cited in the file of this patent
UNITED STATES PATENTS

| | | |
|---|---|---|
| 1,164,397 | Richardson | Dec. 14, 1915 |
| 2,436,201 | Cole | Feb. 17, 1948 |
| 2,464,746 | Gering | Mar. 15, 1949 |
| 2,587,619 | Hofmann | Mar. 4, 1952 |